United States Patent
Heaton et al.

[15] 3,647,410
[45] Mar. 7, 1972

[54] GLASS RIBBON MACHINE BLOW HEAD MECHANISM

[72] Inventors: Richard A. Heaton, Toledo; Maurice J. Sachs, Aurora, both of Ohio

[73] Assignee: Owens-Illinois, Inc.

[22] Filed: Sept. 9, 1969

[21] Appl. No.: 856,289

[52] U.S. Cl. .................................. 65/184, 65/82, 65/264, 65/262
[51] Int. Cl. ........................................ C03b 5/32, C03b 9/14
[58] Field of Search ................................... 65/184, 264, 262

[56] References Cited

UNITED STATES PATENTS

| | | | |
|---|---|---|---|
| 1,833,284 | 11/1931 | Gray | 65/184 X |
| 1,943,195 | 1/1934 | Van Ness | 65/184 |
| 2,280,268 | 4/1942 | Schutz | 65/184 X |
| 2,576,191 | 11/1951 | Pond | 65/264 X |
| 2,729,916 | 1/1956 | Casler et al. | 65/184 X |
| 2,184,900 | 12/1939 | Snyder | 65/184 X |

*Primary Examiner*—Frank W. Miga
*Attorney*—John R. Nelson and Edward J. Holler

[57] ABSTRACT

A blow head mechanism for a glass ribbon type forming machine in which the improved blow head structure and the method of operation thereof employs complete cammed movements for manipulation of the blow shoe and blowpipe, respectively, into and out of engagement with the overlying blowbox and the underlying glass ribbon, the latter moving horizontally with the series of chainlike orifice plates. The positive control of both axially movable members of the chainlike series of blow heads on the machine enables reliable repeatibility of the blowing cycle in making successive articles from the ribbon, and, thereby improves quality of the glassware produced.

4 Claims, 5 Drawing Figures

GLASS RIBBON MACHINE BLOW HEAD MECHANISM

The present invention relates to ribbon-type glass forming machines.

BACKGROUND

The ribbon forming machine type is illustrated and generally described in U.S. Pat. No. 1,790,397 issued to W. J. Woods et al. This machine was initially designed and has for years been successfully employed in blowing hollow glass bulbs for use in incandescent lamps. The machine, as will be apparent from the Woods et al. patent and portions of the disclosure hereinafter set forth, utilizes a blow head turret assembly in which an endless chain travels in a looped path lying in a vertical plane overlying an orifice plate conveyor section moving in an endless looped path in a horizontal plane. The glass at feeding temperature, say about 2,000° F., issues from the orifice of the melting furnace and passes through a pair of cooperating feed rolls to form a so-called continuous ribbon of glass. This ribbon is received on the orifice plate conveyor beneath the feed rolls. The orifice plate conveyor, as the name implies, is comprised of a series of links or plates each having a circular orifice aperture of specified diameter and spaced at predetermined center distances. The glass ribbon being at flow temperature or viscosity causes glass to sag downwardly through the orifice aperture to begin formation of a free-form hollow blank (a parison) under gravity pull.

The forward travel of the orifice plate conveyor brings the glass ribbon and blanks depending therefrom under the region of the overlying carriage of the blow heads. The movement of the blow head turret and the orifice plate conveyor is synchronized so that as the blow head path converges to parallel relationship with the orifice plates, the blow heads and orifices are vertically axially aligned.

At the early span of their synchronous aligned movement, the blow heads are manipulated to engage an overhead blowbox that is stationary and which extends longitudinally along the path of the blow heads. At the same time, or nearly so, the blow heads are further manipulated to descent or "plunge" their blow tips into the glass of the glass ribbon in a region overlying and surrounding the circular orifice of the corresponding orifice plate. In this relationship, controlled puffs of air under regulated positive pressure supply are admitted through the blow heads and their tips sealing in the glass ribbon transmit a "puff" of air into the glass settling through the orifice and further form the glass blank (parison).

With the blow tip in place, air puffing is interrupted at a further point until the blanks pass into a region of the machine in their path of movement with the orifice plate conveyor whereat underlying partible blow molds are synchronously brought in succession to the blanks in axial registry therewith and closed about the blanks. The molds are "paste-molds," water treated, and are rotated for purposes of forming the glass in a steam cushion generated in the mold, thereby forming a seamless glass article.

The molds being closed, the blow heads again receive pressurized air—this time blowing the hollow glass blank until it conforms to the contour of the rotating mold; whereupon, the molds part and the blown glass articles advance attached with the ribbon to a point beyond the molds where the articles are severed (cracked) from the ribbon. But, prior to severance, the blow heads are raised from the ribbon, disengaged from the blowbox and carried in divergent relation in their path from the orifice plates and the glass ribbon.

OBJECTS AND SUMMARY OF INVENTION

The present invention is directed to an improved blow head mechanism and blow head assembly in blow forming glass blanks and resultant glass articles from the glass ribbon.

The invention has for its objects the following:

1. To provide improved double-articulated blowing mechanism on a ribbon glass forming machine.
2. To provide such improvements to the machine for more reliable and uniform ribbon forming of glassware.
3. To provide positive control for movement of the articulated blow head in its operation while engaging the glass ribbon beginning the blow cycle and in certain respects in exiting therefrom; that is, in bringing each blow head into engagement with the glass at the orifice plate with the same force and rate, thereby providing constant plunging movement and in disengaging the blow head from the glass of the ribbon at the end of the puffing and blowing cycle, just described.
4. To provide improved mechanism engaging the blowing mechanism and a manifold or blowbox for applying air under pressure to shape the glass at the orifice plates.
5. To provide a blow head operated by dual roller-cam principle; whereby dual sets of rollers and three cams actuate the articulated blow head in the movements to engage the blowbox and to raise and plunge the blow head onto the glass of the ribbon, and further providing the dual rollers and two cams to bring about the reverse action of the blow head with respect to blowbox and glass ribbon at the end of the forming cycle so that the blow head is raised from the glass and the blow head shoe is spaced (lowered) from the blowbox at the end of the blowbox operation.

In summary, the invention provides method and apparatus for positive control in plunging movement of the blow tip of each blow head into the glass of the ribbon in sequence with seating the blow head shoe on the under side of the blowbox. This provides a suitable seal between blow tip and glass to transmit "puff" air pressure to the glass to form the parison and blow the parison in the body mold in sequence. The positive control of blow head movement effectively seats the shoe on the box and the blow tip in the glass at the proper stage in the process thereby reliably reproducing like conditions for puffing and blowing each successive parison-glass article.

The process and mechanism provided in this invention further reliably reproduce the step of withdrawal (separation) at the end of the forming cycle, namely, withdrawal of blow tip from the glass and disengagement of the blow shoe from the blowbox.

In the apparatus of the invention, the sequence of movements of blow shoes and blow tips at opposite axial ends of the blow heads is positively controlled by cams. Spring bias forces are present in the mechanism for positive cam follower action of the dual-cammed blow heads on the control cams.

Prior art uses a single cam and roller to operate the blow head. The Snyder U.S. Pat. No. 2,184,900 is an example of the prior art.

The present invention is an improvement over Snyder in that the blowpipe, rather than allowing it to extend under spring pressure after cammed lifting it, reverses the motion and the blow head is positively controlled in its downwardly plunging movement (double camming action) so that the blowpipe and glass always engage at the same point in the cycle on the machine and with the same motion rate, depth of penetration one onto the other and with a like force. This produces an improvement of uniformity of product formed on the machine.

Other advantages and objects of the invention will become apparent by reference to the following specification and to the drawings.

ON THE DRAWINGS

FIG. 1A is a perspective view of one partible blow mold (in open position) utilized on mold carriage of the ribbon machine in a series shown at the lower center part of FIG. 1.

DESCRIPTION

Figure 1:
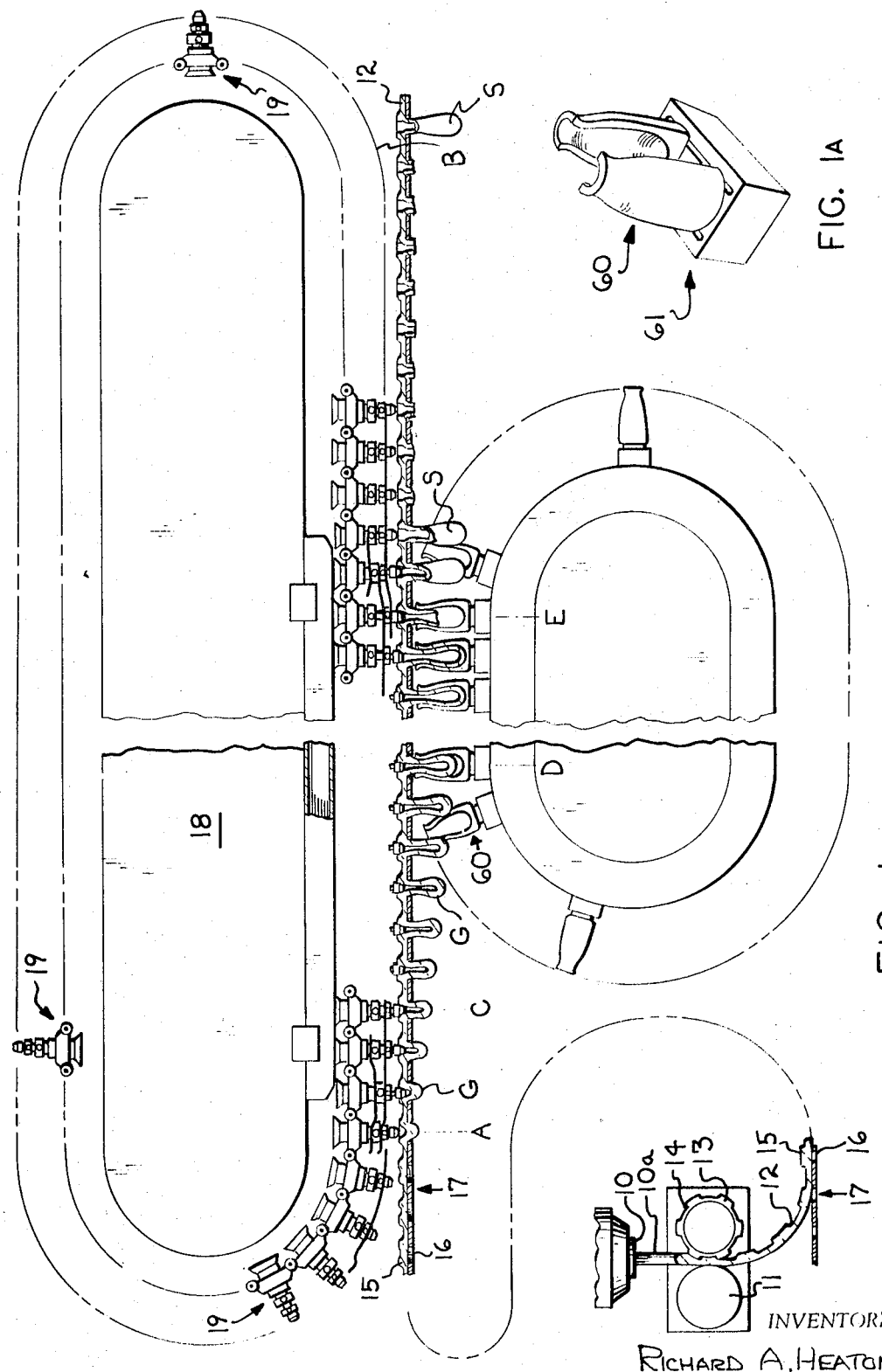
FIG. 1 is a partly schematic, elevational view of a ribbon glass forming machine embodying the present invention.

With specific reference to the drawings, FIG. 1 schematically represents a ribbon-type glass forming process and machine of the present invention. Glass is conditioned in a furnace and fed from an orifice 10 as a continuous stream 10a passing between spaced rolls rotated on horizontal axes. The one roll 11 is cylindrical and has a smooth outer surface which shapes the underside of the resulting glass ribbon 12. The second roll 13, is the "pocket" roll, it being so named by reason of depressions or "pockets" formed peripherally at spaced intervals, such as shown at 14. The pockets 14 form the stream 10a such that the upper surface of the ribbon 12 has spaced-apart mounds or "paddies" of glass 15. The space between the centers of the paddies 15 correspond to the distance between the axial centers of the orifices 16 of the orifice chain 17 and the ribbon is fed onto the orifice chain such that the paddies register axiswise with the orifices. The orifice chain 17 is made up of orifice plates pivotally connected at one side or corner margin in end-to-end fashion to make up a chain that is supported and guided on the machine throughout a horizontally disposed, oval, endless loop or path (not shown, but fully understood by those skilled in the art). The active side of this loop passes beneath a blow head turret or carriage, generally designated 18. As will be readily appreciated, structural frame members are present on the machine to support the orifice chain 17, blow head carriage 18, paddy rolls 11, 13 and mold carriage (presently described) in their proper operating location so as to function on the glass ribbon in making articles therefrom.

The blow head carriage includes end sprockets (not shown) which receive link parts or pins of the blow heads 19 pivotally connected together as a chain in an end-to-end fashion. The sprockets are rotated on horizontal shafts thereby defining for the blow heads an endless chain path or loop that is approximately oval and disposed in a vertical plane. The path of the orifice plates 17 in the horizontal plane and the path of the blow heads 19 in the vertical plane are made to converge and extend parallel to each other for a substantial distance between points A and B, indicated on FIG. 1.

Figure 2:
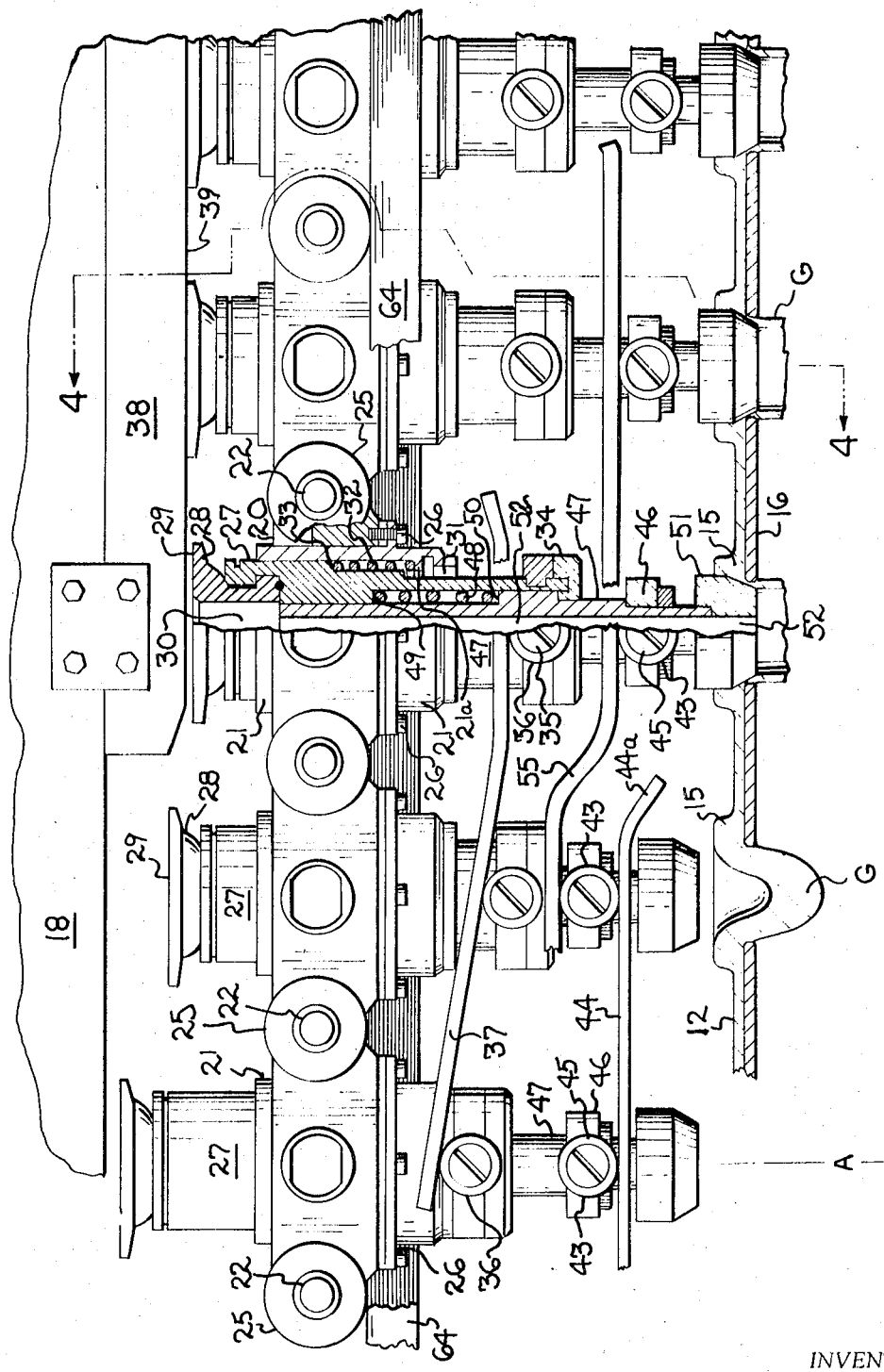
FIG. 2 is a side elevational view, partly in section, illustrating a series of blow heads in operation on the forming machine at the span of movement for successive manipulation of the blow tips of the heads into operative engagement with the glass ribbon on the orifice chain.
Figure 3:
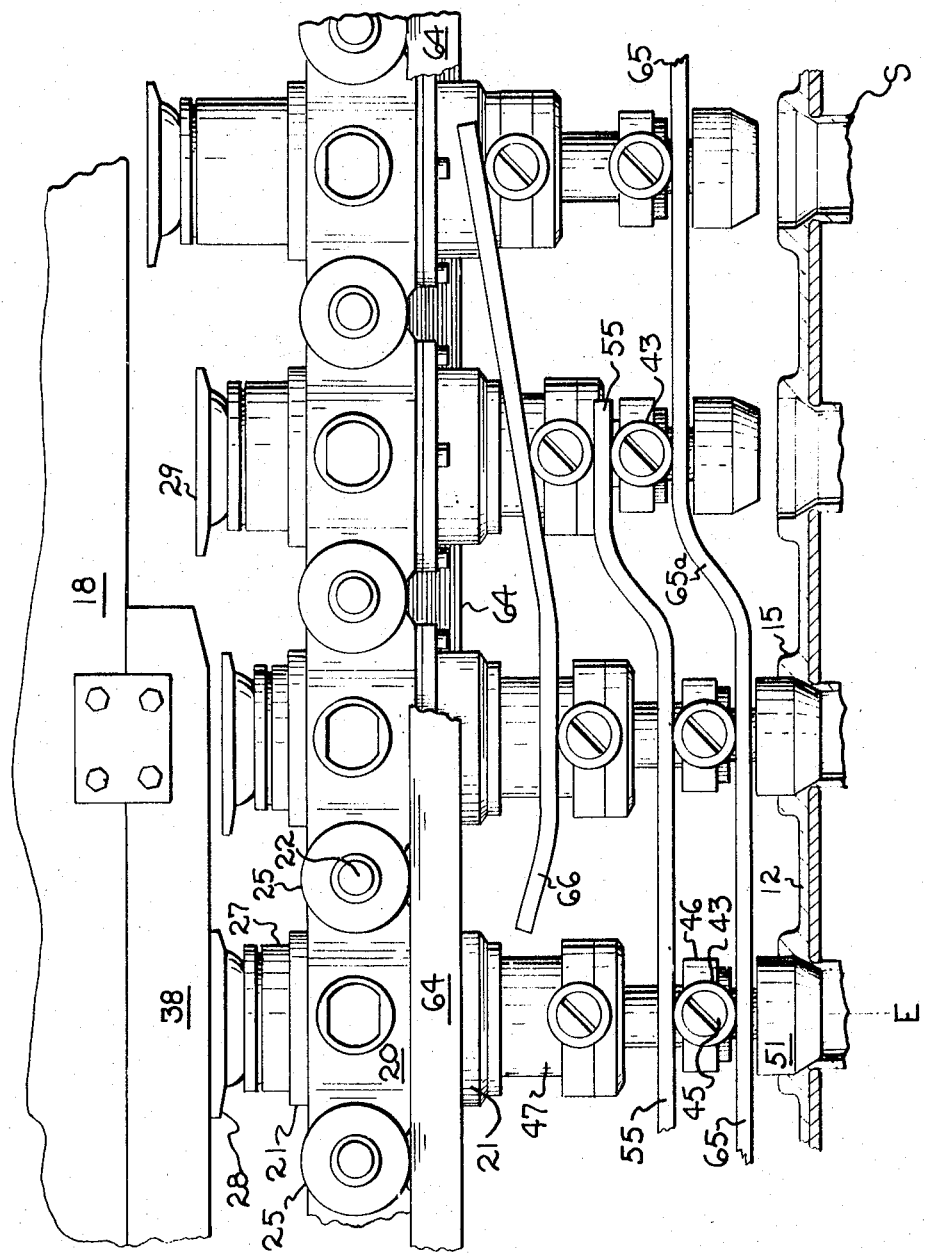
FIG. 3 is a side elevation view, partly sectioned and in part broken away to illustrate (similarly to FIG. 2) a series of the blow heads at the span of movement on the forming machine for successively withdrawing the blow tips out of operative engagement with the glass ribbon after articles are formed and dependently attached to the glass ribbon.
Figure 4:
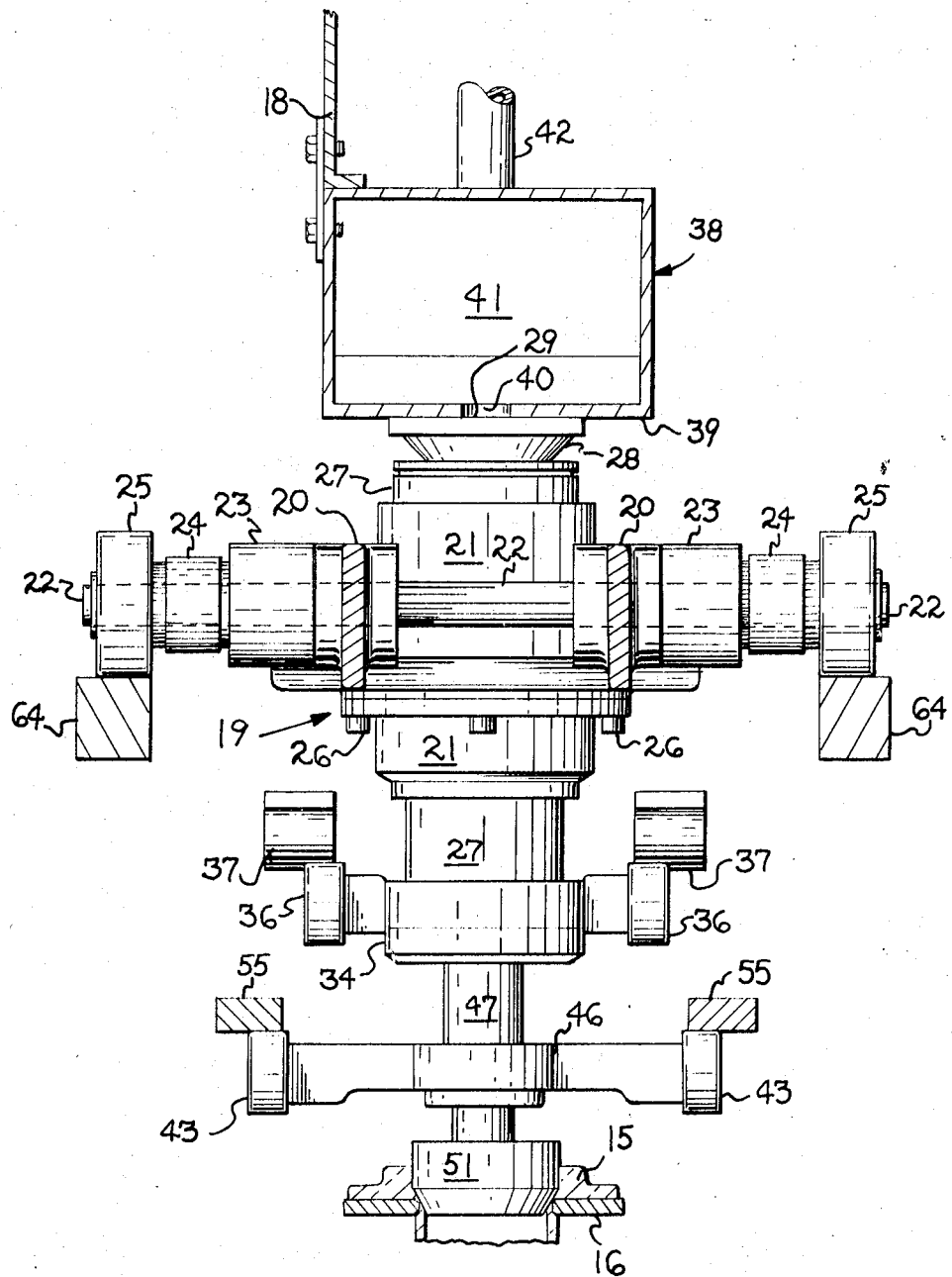
FIG. 4 is an end elevational view taken along line 4—4 on FIG. 2.

Referring to FIGS. 2–4, the blow head carriage is made up of a roller chain in which bosses 20 of each blow head 19 surrounds a cylinder 21. The bosses 20 have journals for a shaft 22 having side link rollers 23, spacers 24 and guide rolls 25 thereon. The shafts 22 make up the link connections one to the other of the blow heads 19 in an endless chain configuration. The reeving of such chain over the main sprockets of the blow head frame propel the blow heads left-to-right on FIGS. 2 and 3 (counterclockwise on FIG. 1). The body cylinder 21 of the blow head is bolted at 26 to the boss 20 to make up a link body assembly of the blow head.

Interiorly of body cylinder 21 is a telescopically assembled sleeve 27 for the pressure shoe of blow shoe 28, the latter being secured near the top of sleeve 27. Blow shoe 28 is bell-shaped or flared outwardly and has a flat, annular upper face 29 and a central air passage 30. Sleeve 27 is retained in cylinder 21 by the lower bushing 31 and is upwardly biased by coil spring 32 compressed between radial ledge 21a and the surface 33 of sleeve 27. At the lower end of sleeve 27 is a collar 34 which includes a lateral pivot shaft 35 and cam roller 36 pivoted on the shaft.

As each blow head 19 advances past point A of the horizontal path, cam roller 36 in the raised position enters into engagement with the upturned forward end of stationary cam 37 mounted on the blow head frame (see FIG. 2). The internal spring 32 urges the roller 36 and sleeve 27 upwardly to a position that would normally cause blow shoe 28 to interfere with the forward end of wind box 38, however, cam 37 is contoured to pull down sleeve 27 and shoe 28 below the bottom plate 39 of the wind box. This carries blow shoe 28 beneath the wind box a short span; whereupon cam 37 again raises causing the top surface or pressure face 29 of shoe 28 to seat itself on bottom plate 39. Bottom plate 39 has a longitudinal series of apertures 40 at predetermined spacings along the active span of the wind box (see FIG. 4). Air under predetermined, regulated pressure (say 5 to 8 pounds per square inch) is supplied into the interior chamber 41 of the wind box through inlet pipe 42 from a suitable air source. As the blow head shoes advance longitudinally of bottom plate 39, air will flow serially through spaced apertures 40 and axially of the blow head in the central passage 30 (FIG. 2). The spring bias holds the blow shoe in contact with the bottom plate for the length of movement on the wind box needed for operation in applying blowing air to mold the glass of the ribbon moving beneath the blow heads as will now be described.

Looking again at the left-hand side of FIG. 2, as the roller and cam 36, 37 engage for manipulating the blow shoe, a second cam roller 43 is rolling on lower cam 44. The roller 43 is pivotally mounted at pivot pin 45 on the collar 46 which is secured to the lower end of inner sleeve or hollow spindle 47 of the blow head. This spindle is spring biased by spring 48 compressed between the internal ledge 49 of sleeve 27 and the radial outer surface 50 of the spindle 47. This normally extends spindle 47 downwardly toward the glass ribbon 15 on the orifice plate 16. The lower end of spindle 47 is threaded to receive a blow tip 51 having a central passage 52 that communicates with passage 30 of the blow shoe. The blow tip 51 and hollow spindle 47 make up a blowpipe of the assembly. Thus, as cam roller 43 traverses most of cam 44, the blowpipe is held in raised position over the glass of its underlying paddy 15 of the glass ribbon. As may be seen on FIG. 2, the glass of the paddy 15 has begun to sag through the orifice and the hollow parison of glass G begins its free formation. At the time the blow shoe is under the blowbox, and just before it is raised onto the bottom plate 39, cam 44 dips abruptly at its terminal end 44a. The plunging of the blowpipe into the glass paddy is positively controlled by the combination of the terminal cam 44a and the parallel extent of upper cam 55. Spring 48 of the blow head tends to force roller 43 to follow cam 44a and the upper cam 55 positively assists spring 48 in plunging the blowpipe tip to a predetermined depth into the paddy of glass, setting up the glass in the glass ribbon 15, and making the seal necessary to form the parison G in the process. The positive step of seating and sealing the blowpipe in the glass is repeated with reliability as between successive blowpipes and glass paddies for uniformity of operation.

As the blow shoe 28 is now receiving blow air from the overhead blow box 38, this pressurized air is conveyed into the hollow of glass parison G for performing steps in the formation of the glass article, first by sequential puffs of air for elongating the glass parison and subsequently by prolonged air application internally of the parison after it is enclosed by a mold for molding it to the shape of the article S.

Referring to FIG. 1, the air is applied to the glass at about position C and sequential puffs elongate the glass shape. At about position D, the halves of the body mold 60 close around the glass and thereafter steady air pressure molds the glass to shape up to position E. At this point, blow air application ceases and mold halves 60 open by a parting movement. The molds are on a chainlike carriage, represented at 61, which includes the well-known mechanism for opening and closing the mold halves during each molding cycle. A schematic representation of a complementary pair of mold halves is shown on FIG. 1A.

During the movement of the blow heads 19 in the operating span of the carriage therefor, the elevation of travel is under the control of the longitudinal pair of parallel side rails 64 attached on the machine frame. The guide rollers 25 of each blow head in the chain travel over rails 64 to transport the body assembly of the blow heads at a fixed elevation spaced above the horizontal orifice chain path.

As the drive of the machine assembly 18 advances the chain of the blow heads 19 forward (counterclockwise on FIG. 1 and left-to-right on FIGS. 2 and 3), the lower cam roller 43 of each blow head assembly 19 is limited in upward movement or "bounce" by the underside of stationary horizontal cam 55, at least in the initial stages of travel while the blow tip 51 is seating in the glass of paddy 15 and preliminary stages of blow air application to the glass parison G are well under way. The cam 55 may extend continuously through the horizontal operating span from location A to beyond location E (FIG. 1) of the machine. The illustrated and preferred embodiment has cam 55 interrupted for a middle portion of this span. The terminal end of cam 55 again appears on FIG. 3.

At the time the blow heads and glass of ribbon 12 pass beyond the mold parting point just beyond E on FIG. 1, lower cam roll 43 is picked up by the cam 65. This cam and cam 55 are essentially parallel, the latter ending after lower cam 65 raises at its intermediate segment 65a. The raised segment 65a of the cam lifts blow tip 51 against its spring 48 and retracts the tip above the glass ribbon. Cam 65 continues until after the paths of ribbon 12 and the blow heads 19 diverge near the end of the ribbon machine operating stand.

Just prior to the point of raising the blow tip, the upper cam roller 36 engages cam 66 which pulls the upper face 29 of the blow shoe downwardly away from engagement on blow box 38. Cam 66 carries the blow shoe 29 thusly past the terminal end of blowbox 38, whereat the cam gradually returns blow shoes 28 to the relaxed or fully extended projecting position permitted by spring 32 and the collar 34 butting against the bottom end of body cylinder 21.

After the paths of blow heads 19 and ribbon 12 diverge at the right-hand end of the machine (FIG. 1), the formed glass article S pendant on the glass ribbon is cracked free and transferred from the machine by suitable means known to those skilled in this art. As may be seen on the overall machine drawing, after molds 60 part from article S they diverge downwardly and away from the path of ribbon 12.

The invention claimed is:

1. In a glass working machine for forming hollow glass articles, the combination of a plurality of blow heads, said blow heads each including a link body assembly and means connecting said link body assemblies together as articulated links of a blow head carrier, means mounting said carrier for operative movement in an endless path and including in said path movement along a horizontal operative run, a blow head sleeve, said body assembly defining a housing for said sleeve, said sleeve having an axial air passage, a blowpipe telescopically mounted in said sleeve for axial relative movement, said blowpipe having an axial air passage connected with said sleeve air passage, a first cam follower means, means connecting said first follower means on said blowpipe, a second cam follower means, means connecting said second follower means on said sleeve, a blowbox conduit means, means connecting said blowbox means on the machine along said horizontal operative run of the carriage and spaced above said blow heads thereat, a supply of blow air connected into said blowbox means, the latter having apertures adapted for connection of blow air to said sleeve air passage, a first cam, means attaching said cam on the machine for engagement with said first cam follower means responsive to movement of the blow head by said carriage along said horizontal operative run, said first cam initially maintaining each said blowpipe in a retracted position in said operative run, a second cam, means connecting said second cam on the machine for engagement with said second cam follower means responsive to movement of the blow head by said carriage along said horizontal operative run, said second cam including a first segment for lowering each said sleeve initially out of connection with said blowbox means and a second segment for raising each said sleeve for connecting its air passage with said blowbox apertures, and a third cam, means connecting said third cam on the machine in said horizontal operative run to extend horizontally beyond said first cam and be engageable with said first cam follower means responsive to movement of the blow head, said third cam positively shifting each of said blowpipes into an extended operative position for blowing glass on the machine, thereby successively uniformly manipulating the blowpipes into an operative glass working position on the machine.

2. The mechanism defined by claim 1, wherein the blow head sleeve is spring biased in its mounting in said link body assembly for normally extending the sleeve axially for engagement with the blowbox means, said second cam and second cam follower means moving said sleeve for compressing the spring initially and thereafter releasing the sleeve for axial movement by said spring, whereupon the upper end surface of said sleeve engages the blowbox means and is held in operating contact therewith by said spring bias.

3. The mechanism defined by claim 1, wherein the blowpipe is spring biased in a telescopic mounting on said blow head sleeve for normally extending the blowpipe axially outwardly from said sleeve toward operative glass working position, said first cam cooperates with said first cam roller and spring bias of the blowpipe of said blow head units.

4. The mechanism defined by claim 1, wherein said first cam includes a terminal portion positioned along the horizontal operative run whereat said first cam terminal portion, cooperating with the first cam rollers, retracts the blowpipe from its glass working position.

* * * * *